United States Patent [19]

Yang

[11] Patent Number: 5,555,545

[45] Date of Patent: Sep. 10, 1996

[54] CONNECTING APPARATUS FOR INTERCONNECTION BETWEEN SERIAL DATA TRANSMISSION DEVICES

[75] Inventor: Jeng-Rern Yang, Taipei, Taiwan

[73] Assignee: Gemtek Technology Co., Ltd., Taipei, Taiwan

[21] Appl. No.: 264,484

[22] Filed: Jun. 23, 1994

[51] Int. Cl.[6] .................................. H04B 1/38; H04L 5/16
[52] U.S. Cl. ......................... 375/220; 375/257; 375/377
[58] Field of Search .................................... 375/219, 220, 375/377, 257; 379/399; 370/79, 82, 83

[56] References Cited

U.S. PATENT DOCUMENTS

| | | | |
|---|---|---|---|
| 4,580,239 | 4/1986 | Greenhill et al. | 375/377 |
| 4,670,886 | 6/1987 | Newcombe, Jr. et al. | 375/377 |
| 4,686,506 | 8/1987 | Farago | 375/377 |
| 4,852,041 | 7/1989 | Nakano | 375/377 |
| 4,884,287 | 11/1989 | Jones et al. | 375/377 |
| 5,331,672 | 7/1994 | Evans et al. | 375/377 |

*Primary Examiner*—Stephen Chin
*Assistant Examiner*—Don Vo
*Attorney, Agent, or Firm*—Beveridge, DeGrandi, Weilacher & Young, LLP

[57] ABSTRACT

A connecting apparatus for interconnection between serial data transmission devices, includes a DTE/DCE selector switch, a signal level converter, a single chip CMOS CPU and the RJ45 telephone bus cables, wherein the CPU controls the receiving and transmitting modes between the signal lines of the RS232 interface and the RJ45 telephone bus cables and also controls data transmission time so as to prevent the connected serial data transmission devices from sending out data at a time. The connecting apparatus can be connected with personal computers, serial printers, plotters or modems in series for data transmission to and from one another, and therefore jumper cables between either two data transmission devices are eliminated. Furthermore two connecting apparatus may be interconnected through RJ45 telephone bus cables, therefore it is easy to install and to expand data transmission devices.

2 Claims, 2 Drawing Sheets

CONNECTING APPARATUS FOR INTERCONNECTION BETWEEN SERIAL DATA TRANSMISSION DEVICES

TECHNICAL FIELD

The present invention relates to electrical connecting apparatus, and more particularly to such a connecting apparatus for interconnection between the RS232 interfaces of multiple serial data transmission devices. Two connecting apparatus may be interconnected through RJ45 telephone bus cables so that a plurality of data transmission devices including personal computers, serial printers, plotters or modems can be connected in series for data transmission between personal computers, and therefore jumper cables between either two data transmission devices are eliminated.

BACKGROUND OF THE INVENTION

Different jumper cables may be used for interconnection between the RS232 interfaces of different serial data transmission apparatus. The installation of these jumper cables is complicated. The use of regular jumper cables is practical for intercommunication between two apparatus or for serial data transmission from one apparatus, which sends out data, to a plurality of apparatus, which receive data only. It is quite commonly in offices, factories, laboratories, etc., that serial data have to be transmitted from one serial data transmission apparatus to another, for example: the measured data from an instrument may have to be transmitted to a personal computer; a personal computer may have to send a file to a plotter or a remote apparatus through a modem; two or more personal computers may have to exchange files. When serial data transmission is needed among a variety of serial data transmission apparatus, the installation of different jumper cables often bothers the users.

SUMMARY OF THE INVENTION

The present invention has been accomplished under the aforesaid circumstances. It is the principal object of the present invention to provide a connecting apparatus which allows a variety of serial data transmission devices to be connected in series for data transmission with one another. The connecting apparatus comprises a central processing unit which monitors the directions of external signals so as to determine the connections of the signal lines and, which controls data transmission time so as to prevent the connected serial data transmission devices from sending out data at a time.

Furthermore, the use of 8-wire RJ45 telephone bus cables for interconnection between connecting apparatus makes the wiring convenient. Only one additional connecting apparatus is needed when an additional transmission device is installed.

Still another advantage of the connecting apparatus is its practicability for a long distance data transmission as far as 1000 feet at a baud rate of 100 k.

BRIEF DESCRIPTION OF THE DRAWINGS

The present invention will now be described by way of example with reference to the annexed drawings, in which.

DETAILED DESCRIPTION OF THE PREFERRED EMBODIMENT

Figure 1:
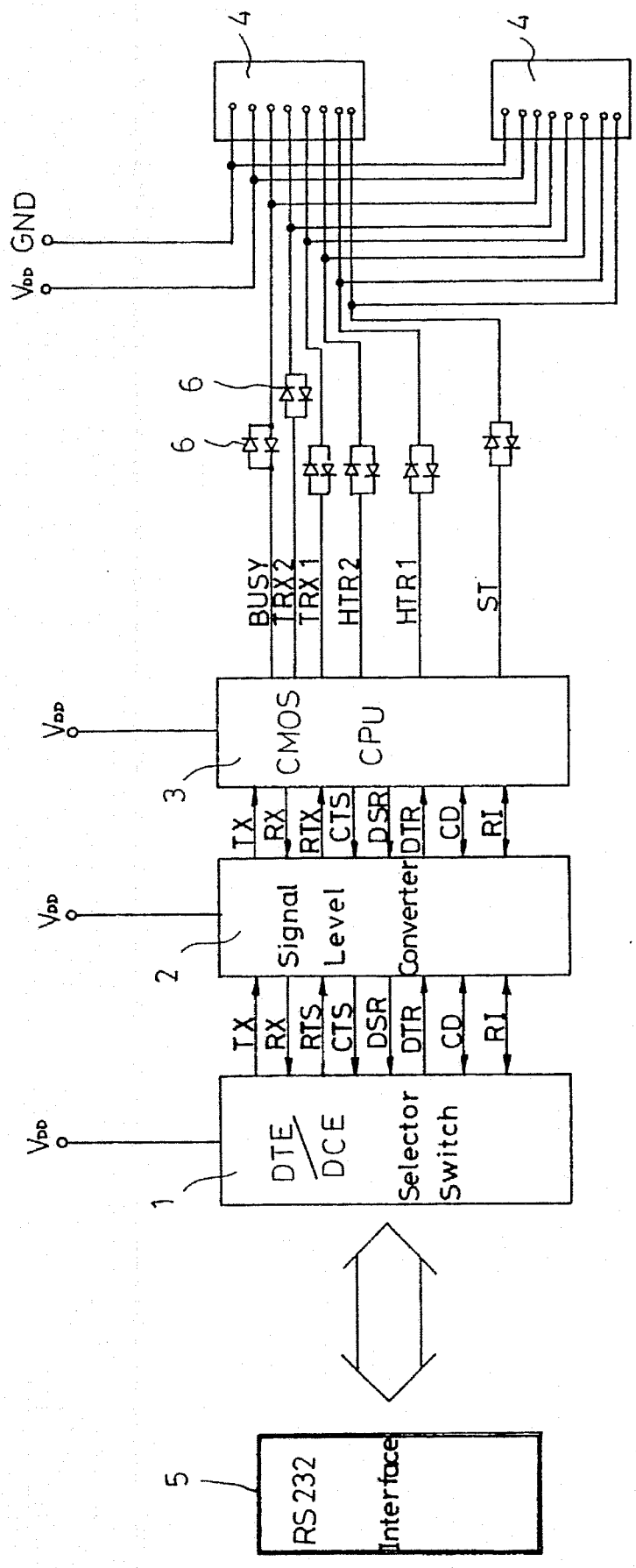
FIG. 1 is a circuit layout according to the present invention.

Referring to FIG. 1, a connecting apparatus in accordance with the present invention comprises mainly a DTE/DEC selector switch 1, a signal level converter 2, a single chip CPU (central processing unit) 3, and RJ45 telephone bus cables 4.

Figure 2:
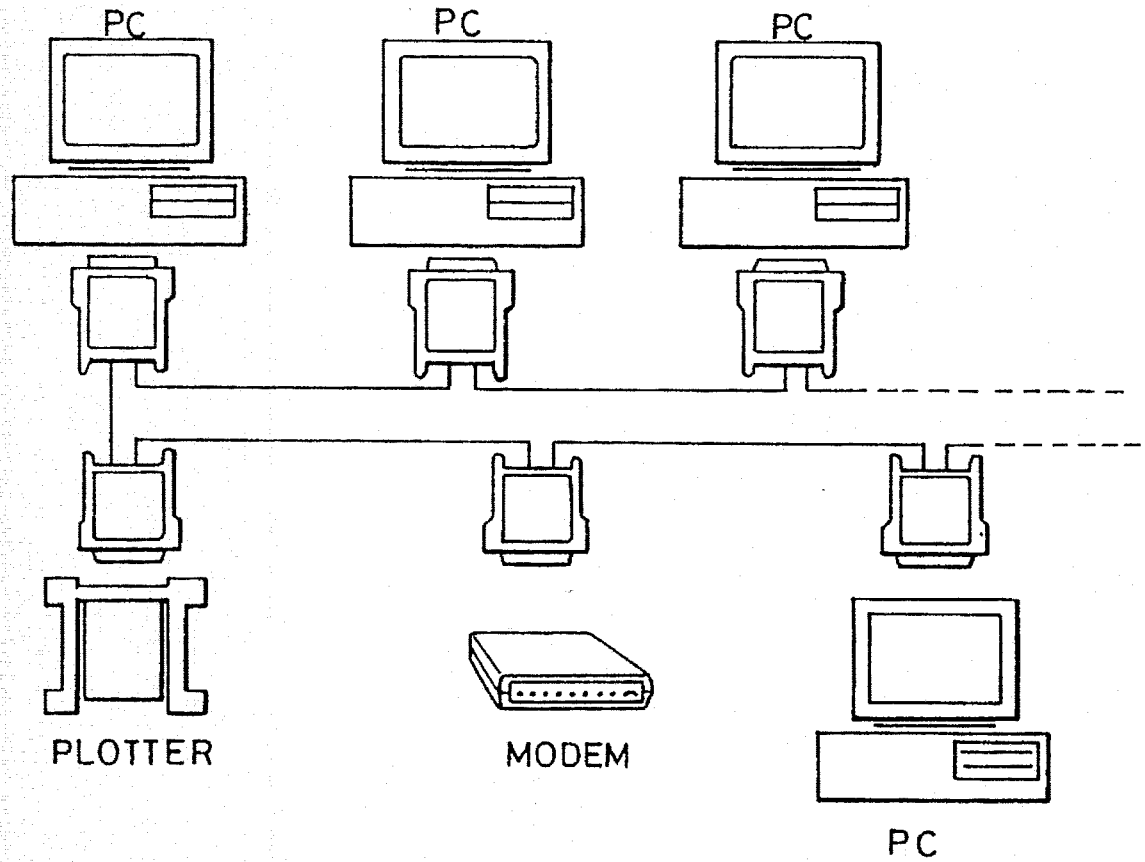
FIG. 2 is an installed view showing a plurality of serial data transmission devices interconnected according to the present invention.

The signal level converter 2 converts the signal level from the R8232 interface 5 of the apparatus into a TTL level for processing by the CPU 3, or the output TTL level of the CPU 3 into a level acceptable to the RS232. A plurality of connecting apparatus may be connected in series by telephone bus cables so that a plurality of serial data transmission devices can be interconnected with one another (see FIG. 2).

The receiving and transmitting directions and positions of contact pins of the signal lines of the RS232 are arranged subject to the type of the interface as follows:

|     | DTE MODE |     | DCE MODE |     |
| --- | --- | --- | --- | --- |
| TX  | Pin2 | Out | Pin3 | Out |
| RX  | Pin3 | In  | Pin2 | In  |
| RTS | Pin4 | Out | Pin5 | Out |
| CTS | Pin5 | In  | Pin4 | In  |
| DSR | Pin6 | In  | Pin20 | In |
| GND | Pin7 |     | Pin7 |     |
| CD  | Pin8 | In  | Pin8 | Out |
| DTR | Pin20 | Out | Pin6 | Out |
| RI  | Pin22 | In  | Pin22 | Out |

The signal lines of the RS232 are basically divided into three groups:

1) Data transmission lines: TX, RX
2) Handshaking type conversation lines: RTS, CTS, DSR, DTR
3) Status display lines: CD, RI The CPU 3 classifies the signal lines of the aforesaid RS232 and connects the signal lines to the respective lines of the RJ45 telephone bus cables 4 according to their receiving and transmission directions. The 8-wire RJ45 telephone cable 4 (each includes 8 wires) works as follows:

Wire1 ST: for the transmission of CD and RI status signals from DCE to DTE.

Wire2 HTR1 and Wire3 HTR2: for receiving signals from and transmitting signals to the handshaking type conversation lines of RTS, CTS, DSR, DTR.

Wire4 TRX1 and Wire5 TRX2: for the transmission and receiving of data signals.

Wire6 BUSY: for line busy display to stop other connected connecting apparatus from transmitting data.

Wire7 VDD: for power supply.

Wire8 GND: for connection to earth.

Except Wire7 VDD and Wire8 GND, Wire1 to Wire6 are connected to the I/O bus lines of the CPU 3, wherein the I/O port, to which Wire1 ST is connected, is defined as an input port when at the DTE state or output port when at the DCE state; the I/O ports, to which HTR1, HTE2, TRX1, TRX2 and BUSY signal lines of Wire2 through Wire6 are connected, are of tri-state programmable I/O ports. When the connecting apparatus receive no command to transmit or receive data, these tri-state programmable I/O ports are set to the mode of High impedance input port and, the CPU 3 monitors the signals from the RJ45 telephone bus cables 4 or the RS232 interface 5. The monitoring process of the CPU 3 is outlined thereinafter.

The CPU 3 provides four control modes according to the sources of external signals, namely, the monitoring mode, the listening mode, the listening and answering mode, and the speaking mode.

1) The monitoring mode:

The I/O ports, to which HTR1, HTR2, TRX2, BUSY and ST signal lines are connected, are set as High impedance input ports, and the CPU 3 starts monitoring if there is any command from the RS232 interface 5 for signal transmission and also to monitor if there is any signal transmitted from the RJ45 telephone bus cables 4. When there is a signal transmitted from the RJ45 telephone bus cables 4, the CPU 3 immediately enters the listening mode; when there is a command from the RS232 interface 5 for transmitting data, the CPU 3 immediately enters the speaking mode.

2) The listening mode:

The I/O ports, to which HTR1, HTRS, TRX2, BUSY and ST signal lines are connected, are set as High impedance input ports, and the CPU 3 reads in RTS and DTR handshaking conversation signals from HTR2 and then transmits the signals to the CTS and DSR signal lines of the RS232 interface 5, and at the same time the CPU 3 reads in external data from TRX2 and then transmits the data to the RX signal line of the RS232 interface 5. If it is at the DTE state, the CPU 3 immediately reads in the CD and RI status signals from ST and then transmits the status signals to the CD and RI of the RS232 interface 5. During the listening mode, the CPU 3 also monitors the BUSY line. If the BUSY line is at Low state, it means the opponent transmitting end has terminated the transmission, and therefore the CPU 3 immediately ends the listening mode and returns to the monitoring mode.

3) The listening and answering mode:

When CPU 3 receives a command for transmitting an answer after the listening of an external signal by the RS232 interface 5 during the listening mode, the CPU 3 immediately enters the listening and answering mode. During the listening and answering mode, the CPU 3 first monitors the HTR1 and TRX1 signal lines. If the HTR1 and TRX1 signal lines are not engaged, the I/O ports of the CPU 3, to which the HTR1 and TRX1 signal lines are connected, are set as output ports, the I/O ports of the CPU 3, to which the HTR2, TRX2, BUSY and ST signal lines are connected, are operated like the listening mode, however, the I/O port of the CPU 3, to which the HTR1 signal line is connected, is set to transmit the RTS and DTR signals from the R8232 interface 5 and the I/O port of the CPU 3, to which the TRX1 is connected, is set to transmit the TX signal from the R8232 interface 5. If it is at the DCE state, the I/O port of the CPU 3, to which the ST signal line is connected, is set as an output port to transmit the CD and RI signals from the RS232 interface 5. At this stage, the CPU 3 also monitors the BUSY line. If the BUSY line is at Low state and the RS232 has no command for sending out an answer within a certain length of time, the CPU 3 immediately terminates the listening and answering mode and then returns to the monitoring mode.

4) The speaking mode:

The I/O ports of the CPU 3, to which the HTR1 and TRX1 signal lines are connected, are defined as High impedance input ports, and the I/O ports, to which the HTR2 and TRX2 and BUSY signal lines are connected, are defined as output ports, wherein the I/O port, to which the HTR1 signal line is connected, transmits the external RTS and DTR signals to the CTS and DSR signal lines of the RS232 interface 5 respectively; the I/O port, to which the TRX1 signal line is connected, transmits the external TX data signal to the RX signal line of the RS232 interface 5; the I/O port, to which the HTR2 signal line is connected, transmits the RTS and DTR signals from the RS232 interface 5 to the telephone bus cables 4; the I/O port, to which the TRX2 signal line is connected, transmits the TX data signal of the RS232 interface to the telephone bus cables; the I/O port, to which the ST signal line is connected, is set as an input port or output port subject to the DTE or DCE state for the transmission of the CD and RI signals.

When the CPU 3 enters the speaking mode, the BUSY line is turned to the High state. The BUSY line will be turned to the Low state a certain length of time after the RS232 interface 5 or external signal does no work, thereby causing the CPU 3 to terminate the speaking mode and return to the monitoring mode.

Through the aforesaid four control modes, the CPU 3 uses a 20 MHZ clock to monitor the whole signal intercommunication work. Because every signal line of the RJ45 telephone bus cable 4 has the feature of a programmable I/O, the data signals, handshaking conversation signals and status signals of the RS232 interface 5 can be automatically connected according to their directions.

Furthermore, the connecting apparatus of the present invention has been specially designed to fit long distance high speed data transmission works. Regular RS232 cables are not suitable for a long distance high speed data transmission because of the following two reasons.

1) A long distance high speed data transmission will cause the problem of signal reflection.

2) The electric current at the transmission line for the transmission of the signal will produce a potential drop, causing the ground potentials at the receiving and transmitting ends to be unequal.

The signal reflection problem is more serious. More particularly when the current output is a Low state signal, if the output of the last bit was the High state, the reflected signal will be overlapped on the current Low state signal, thereby causing an error. This problem is overcome by connecting a pair of reversed diodes 6 to each signal line. If the current output is a Low state signal, the reflected signal of the last High state output will be dropped by 0.7 Volt when it passes through either diode. Because the signal passes through total four pieces of diodes 6 per cycle, every reflected signal is effectively dropped, and therefore the signal overlapping problem is eliminated. Furthermore, in order to prevent the problem of potential drop, the I/O ports are respectively turned to the High impedance status when receiving signals, and therefore the signal current is at a low level. Besides, the connecting apparatus of the present invention uses a low power CMOS IC, which permits only a small electric current to pass. Therefore, according to actual tests, the effective transmission distance of the connecting apparatus of the present invention can be as long as 1000 feet or even longer at Baud Rate of 100 K.

What is claimed is:

1. A connecting apparatus for interconnection between serial data transmission devices with at least one RS232 interface, said apparatus comprising a DTE/DCE selector switch, a signal level converter, a single chip CPU, and RJ45 telephone bus cables, said selector switch connecting the at least one RS232 interface to said signal level converter, said signal level converter converting a signal of a signal level of the RS232 interface to a TTL level for processing by the CPU, and converting a signal of a TTL level of the CPU to the level of the RS232, and said RJ45 telephone bus cables being connected to said CPU, wherein said CPU includes an I/O port, and wherein said apparatus includes paired, reversed diodes for connecting lines of said RJ45 telephone bus cables, except a line for power supply and a line for connection to earth, to said I/O port of said CPU, each said pair of reversed diodes causing a drop in reflected signals during long distance high speed data transmission.

2. A connecting apparatus for interconnection between serial data transmission devices with at least one RS232 interface, said apparatus comprising a DTE/DCE selector switch, a signal level converter, a single chip CPU, and RJ45 telephone bus cables, said selector switch connecting the at least one RS232 interface to said signal level converter, said signal level converter converting a signal of a signal level of the RS232 interface to a TTL level for processing by the CPU, and converting a signal of a TTL level of the CPU to the level of the RS232, and said RJ45 telephone bus cables being connected to said CPU, wherein said CPU has I/O parts, wherein said RJ45 telephone bus cables include lines for HTR1, HTR2, TRX2, BUSY and ST signals, and wherein said CPU has four control modes according to external signal sources, said control modes including a monitoring mode in which I/O ports, to which said HTR1, HTR2, TRX2, BUSY, and ST signal lines are connected, are set as High impedance input ports, and in which said CPU monitors whether there is any command from the RS232 interface for signal transmission and also monitors whether there is any signal transmitted from said RJ45 telephone bus cables such that when there is a signal transmitted from said RJ45 telephone bus cables, said CPU immediately enters a listening mode, and when there is a command from the RS232 interface for transmitting data, said CPU immediately enters a speaking mode;

in said listening mode said I/O ports, to which said HTR1, HTR2, TRX2, BUSY and ST signal lines are connected are set as High impedance input ports, said CPU reading in RTS and DTR handshaking conversation signals from HTR2 and then transmitting the signals to CTS and DSR signal lines of the RS232 interface, at the same time, said CPU reading in external data from TRX2 and then transmitting data to a RX signal line of the RS232 interface such that if said CPU is at a DTE state, said CPU immediately reads in CD and RI status signals from said ST signal line and then transmits said status signals to the CD and RI of the RS232 interface, during said listening mode, said CPU also monitoring said BUSY line such that if said BUSY line is at a Low state, said CPU immediately ends said listening mode and returns to said monitoring mode; in which said CPU enters when said CPU receives a command for transmitting an answer after listening for an external signal by the RS232 interface in said listening mode, during said listening and answering mode, said CPU first monitors said HTR1 and TRX1 signal lines and if said HTR1 and TRX1 signal lines are not engaged, said I/O ports of said CPU to which said HTR1 and TRX1 signal lines are connected, are set as output ports, and said I/O ports to which said HTR2, TRX2, BUSY and ST signal lines are connected are operated as in said listening mode while said I/O port to which said HTR1 signal line is connected is set to transmit the RTS and DTR signals from the RS232 interface and said I/O port to which said TRX1 is connected is set to transmit the TX signal from the RS232 interface and if said CPU is at the DCE state, said I/O port to which said ST signal line is connected is set as an output port to transmit the CD and RI signals from the RS232 interface, said CPU also monitoring said BUSY line such that if said BUSY line is at a Low state and the RS232 has no command for sending out an answer within a certain length of time, said CPU 3 immediately terminates said listening and answering mode and returns to said monitoring mode;

in said speaking mode said I/O ports to which said HTR1 and TRX1 signal lines are connected are defined as High impedance input ports, and said I/O ports to which said HTR2 and TRX2 and BUSY signal lines are connected are defined as output ports so that said I/O port to which said HTR1 signal line is connected transmits external RTS and DTR signals to the CTS and DSR signal lines of the RS232 interface respectively, said I/O port to which said TRX1 signal line is connected transmits the external TX data signal to the RX signal line of the RS232 interface, said I/O port to which the HTR2 signal line is connected transmits the RTS and DTR signals from the RS232 interface to said telephone bus cables, said I/O port to which the TRX2 signal line is connected transmits the TX data signal of the RS232 interface to said telephone bus cables, and said I/O port to which the ST signal line is connected is set as one of an input port and an output port subject to the DTE or DCE state for the transmission of the CD and RI signals, such that when said CPU 3 enters said speaking mode, said BUSY line is placed to a High state, said BUSY line being turned to a Low state a certain length of time after the RS232 interface or external signal does no work, thereby causing said CPU to terminate said speaking mode and return to said monitoring mode.

* * * * *